(12) United States Patent
Meyers et al.

(10) Patent No.: US 9,798,769 B2
(45) Date of Patent: Oct. 24, 2017

(54) SHARING DOCUMENT LINKS FROM MULTIPLE DATA PROVIDERS

(71) Applicant: Microsoft Technology Licensing, LLC, Redmond, WA (US)

(72) Inventors: David L. Meyers, Bellevue, WA (US); Michael B. Palmer, Redmond, WA (US); Betsy Y. McIntyre, Redmond, WA (US); Mirela D. S. Correa, Redmond, WA (US); David P. Limont, Seattle, WA (US); Kenneth Fern, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 14/087,491

(22) Filed: Nov. 22, 2013

(65) Prior Publication Data

US 2015/0149456 A1    May 28, 2015

(51) Int. Cl.
  *G06F 17/30*  (2006.01)
  *H04L 29/08*  (2006.01)
  *H04L 12/58*  (2006.01)

(52) U.S. Cl.
  CPC .... *G06F 17/30424* (2013.01); *H04L 67/1091* (2013.01); *H04L 67/2823* (2013.01);
  (Continued)

(58) Field of Classification Search
  CPC ..... H04L 67/22; H04L 67/06; H04L 67/1095; H04L 67/1091; H04L 67/2823; H04L 67/2842; G06F 17/30017; G06F 17/30023; G06F 17/30424; G06F 2209/462

USPC ....... 709/225, 224, 201, 204, 203, 205, 217, 709/219, 226, 231, 206, 221, 223, 236; 705/3, 14.4, 14.53, 2, 14.49, 14.73, 14.69, 705/400, 7.32, 14.1, 14.17, 14.25, 14.45, 705/14.46, 14.56, 14.58, 14.61, 14.64,
(Continued)

(56) References Cited

U.S. PATENT DOCUMENTS

2002/0010781 A1   1/2002  Tuatini
2006/0265385 A1*  11/2006  Agrawal ........... G06F 17/30566
(Continued)

FOREIGN PATENT DOCUMENTS

EP    2 637 368 A1    9/2013

OTHER PUBLICATIONS

International Preliminary Report on Patentability for International Application No. PCT/US2014/066481, date of mailing: Sep. 25, 2015, date of filing: Nov. 20, 2014, 14 pages.
(Continued)

Primary Examiner — Jay Morrison
Assistant Examiner — Ken Hoang
(74) Attorney, Agent, or Firm — Christopher J. Volkmann; Kelly, Holt & Christenson, PLLC

(57) ABSTRACT

A document sharing system includes a plurality of different data provider implementations. The document sharing system exposes a common application programming interface to a plurality of different clients and receives data requests identifying a given data provider, from the clients. The document sharing system then uses the data provider implementation for the data provider identified in the request, in order to obtain the requested data, and place it in a common data structure that is returned to the client.

19 Claims, 11 Drawing Sheets

(52) U.S. Cl.
CPC .............. *H04L 51/08* (2013.01); *H04L 67/16* (2013.01); *H04L 67/2842* (2013.01)

(58) Field of Classification Search
USPC ...... 705/14.66, 14.68, 14.72, 16, 18, 20, 22, 705/26.1, 26.35, 26.7, 26.8, 27.1, 35, 4, 705/40, 51, 7.33, 7.36; 713/157, 193, 1, 713/150, 194; 707/E17.009, 999.01, 707/E17.001, E17.006, E17.01, E17.044, 707/602, E17.002, E17.005, E17.008, 707/E17.014, E17.032, E17.108, E17.115, 707/634, 637, 692, 707, 736, 741, 752, 707/769, 784, 803, 999.001, 999.101, 707/999.102, 999.103, 999.107; 726/27, 726/17, 2, 19, 26
See application file for complete search history.

(56) References Cited

U.S. PATENT DOCUMENTS

| | | |
|---|---|---|
| 2008/0127110 A1 | 5/2008 | Ivanov et al. |
| 2008/0288466 A1* | 11/2008 | Eisenberger et al. ..... G06F 7/06 707/3 |
| 2009/0049200 A1* | 2/2009 | Lin ................... G06F 17/30569 709/246 |
| 2011/0060622 A1 | 3/2011 | Piersol et al. |
| 2013/0042308 A1* | 2/2013 | Malat ..................... G06Q 30/06 726/5 |
| 2013/0066945 A1 | 3/2013 | Das et al. |

OTHER PUBLICATIONS

International Search Report and Written Opinion for International Application No. PCT/US2014/066481, date of mailing: Feb. 2, 2015, date of filing: Nov. 20, 2014, 13 pages.

Wang, Jianzong, Peter Varman, and Changsheng Xie. "Middleware enabled data sharing on cloud storage services," Proceedings of the 5th International Workshop on Middleware for Service Oriented Computing, ACM, Nov. 29, 2010, pp. 33-38.

Das, Sudipto, Divyakant Agrawal, and Amr El Abbadi. "G-store: a scalable data store for transactional multi key access in the cloud," Proceedings of the 1st ACM symposium on Cloud computing. ACM, Jun. 10, 2010, 12 pages.

Azeez, Afkham, et al. "Multi-tenant SOA middleware for cloud computing." Cloud computing (cloud), 2010 ieee 3rd international conference on. IEEE, Jul. 5, 2010, 8 pages.

Wu, Jiyi, et al, "Cloud storage as the infrastructure of cloud computing." Intelligent Computing and Cognitive Informatics (ICICCI), 2010 International Conference on. IEEE, Jun. 22, 2010, pp. 380-383.

Dillon, Tharam, Chen Wu, and Elizabeth Chang. "Cloud computing: issues and challenges," Advanced Information Networking and Applications (AINA), 2010 24th IEEE International Conference on, Ieee, Apr. 20, 2010, pp. 27-33.

Pathirage, Milirida, et al. "A multi-tenant architecture for business process executions," Web services (icws), 2011 ieee international conference on, IEEE, Jul. 4, 2011, 8 pages.

\* cited by examiner

SHARING DOCUMENT LINKS FROM MULTIPLE DATA PROVIDERS

BACKGROUND

A variety of different types of messaging systems are currently in wide use. Some such messaging systems include, for instance, electronic mail (e-mail) systems, instant messaging systems, communication systems within social networking systems, among others.

In such messaging systems, it is common for users to send attachments (or links to attachments) to one another. In social network systems, users can make attachments or objects available to one another in various groups. The attachments are often provided as a link to an object, such as a document, a picture, a directory, a folder, etc. The objects are stored at a given location. Because a wide variety of different users tend to send one another a wide variety of different types of attachments, the attachments can be located in a wide variety of different locations, and they can be provided by a variety of different data providers.

This can present some challenges. For instance, different data providers often provide data in different structures, formats, or according to different schemas. For a given client to obtain access to data from multiple different providers, the client normally downloads a separate client application for each provider. When the client wishes to obtain data from a given provider, it uses the client application associated with that provider.

The discussion above is merely provided for general background information and is not intended to be used as an aid in determining the scope of the claimed subject matter.

SUMMARY

A document sharing system includes a plurality of different data provider implementations. The document sharing system exposes a common application programming interface to a plurality of different clients and receives data requests identifying a given data provider, from the clients. The document sharing system then uses the data provider implementation for the data provider identified in the request, in order to obtain the requested data, and place it in a common data structure that is returned to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
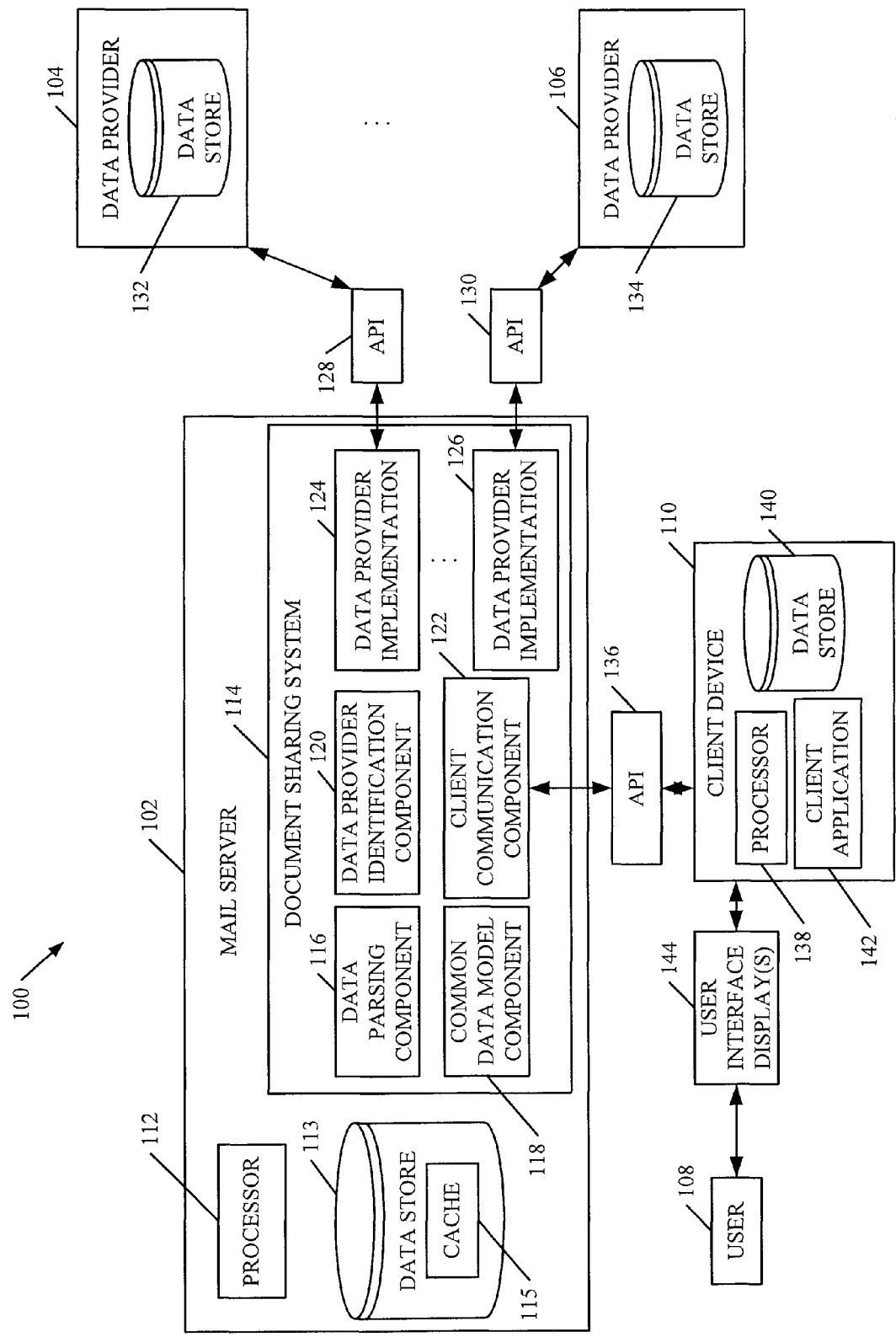
FIG. 1 is a block diagram of one illustrative document sharing architecture.

FIG. 1 is a block diagram of one illustrative document sharing architecture 100. Architecture 100 illustratively includes a messaging server (such as an electronic mail server) 102 that interacts with a plurality of different data providers 104-106. It will be appreciated that data providers 104-106 can be cloud-based data providers or other hosted data providers, or they can be local to mail server 102. A number of these different architectures are described below with respect to FIG. 4. Suffice it to say, for now, that mail server 102 illustratively receives data requests from a user 108 through a client device 110, for information stored on one of data providers 104-106. Mail server 102 accesses the appropriate data provider and provides the requested data back to client device 110 for display to user 108.

In the embodiment shown in FIG. 1, mail server 102 includes processor 112, data store 113 (with cache 115) and document sharing system 114. Document sharing system 114 illustratively includes data parsing component 116, common data model component 118, data provider identification component 120, client communication component 122 and a plurality of data provider implementations 124-126. Each data provider implementation 124-126 (which can be written by a third party to implement a defined interface) exposes a corresponding application programming interface 128-130, respectively. The data providers 104-106 illustratively include corresponding data stores 132 and 134, respectively. The information stored in data stores 132 and 134 is illustratively served by a server or other processor in data providers 104-106, respectively. Data providers 104-106 illustratively communicate with document sharing system 114 and mail server 102 over their corresponding application programming interfaces 128-130 exposed by their corresponding implementations 124-126, respectively.

Client communication component 122 in mail server 102 illustratively exposes a client application programming interface (API) 136. Client 110 communicates with mail server 102 over client API 136.

In the embodiment shown in FIG. 1, client device 110 illustratively includes processor 138, data store 140 and one or more client applications 142. Client applications 142 illustratively include a communication application (such as an e-mail application) that generates user interface displays 144 with user input mechanisms that allow user 108 to interact with mail server 102, such as to send and receive messages that can include attachments.

Before describing the operation of mail server 102 (and specifically document sharing system 114) in more detail, a brief overview will be provided to enhance understanding. It is first assumed that user 108 logs into the e-mail system implemented by mail server 102, and requests data from one of the data providers 104-106 (such as attaching an attachment to a message or retrieving an attachment from a message). This request is sent using the common application programming interface 136 exposed by client communication component 102, which handles client communication with client devices (such as device 110). The request for data illustratively identifies a specific data provider so that document sharing system 114 illustratively uses the proper data provider implementation 124-126 to communicate with the identified data provider over the corresponding application programming interface 128-130. The requested data is received from the corresponding data provider and parsed by parsing component 116 into a common data structure represented by common data model component 118. The common data structure presents data from a plurality of different data providers 104-106 according to a common structure (that is the same, regardless of the data provider) that can be viewed by user 108 using client device 110. A more detailed description of the operation of architecture 100 will now be provided.

Figure 2:
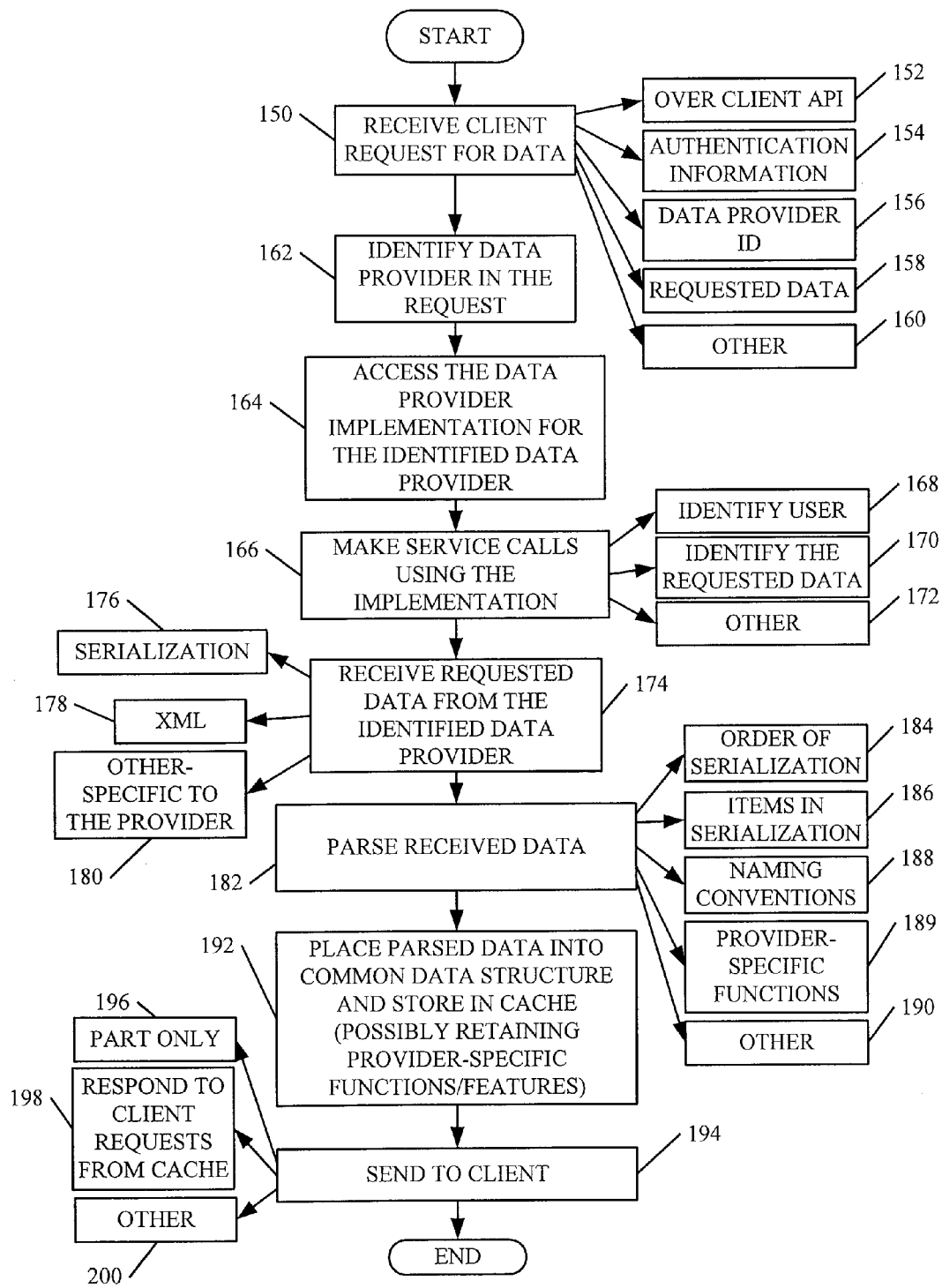
FIG. 2 is a flow diagram illustrating one embodiment of the operation of the document sharing architecture shown in FIG. 1.

FIG. 2 is a flow diagram illustrating one embodiment of the operation of architecture 100 in more detail. FIGS. 1 and 2 will now be described in conjunction with one another.

It is first assumed that user 108 wishes to obtain information from a data provider (such as by attaching an attachment to a message, opening an attachment in a message or otherwise). It is also assumed that data providers 104-106 illustratively store data, and provide it in response to requests, using their own formats, protocols, schemas, or at least different data structures, which may be different from one another. In one embodiment, however, common data model component 118 obtains data that is parsed by data parsing component 116, from the various data providers, and represents it to user 108 (through client device 110) in a common way, regardless of the specific data provider that provides the data.

At some point, then, user 108 interacts with user interface displays 144 to request access to data from a specific data provider. Client communication component 122 receives this request via API 136 from client device 110. Receiving the client request for data is indicated by block 150 in the flow diagram of FIG. 2. Receiving it over the client API is indicated by block 152. The request can include authentication information 154, such as log-in information that allows client 108 to log into e-mail server 102. It also illustratively includes a data provider identifier 156. This uniquely identifies the specific data provider 104-106 from which the data is being requested. The data request also illustratively includes an identity of the requested data 158. Of course, the request can include other information 160 as well.

The data request provided using API 136 is then passed to data provider identification component 120 which identifies the particular data provider 104-106 from which the data is being requested. Identifying the data provider in the request is indicated by block 162 in FIG. 2.

Document sharing system 114 then uses the particular data provider implementation 124-126 to interact with the identified data provider 104-106. For the sake of the present discussion, it is assumed that the data request passed in using API 136 by client device 110 has identified data provider 104 as the particular data provider from which data is being requested. The data request can be a wide variety of different types of requests, such as to obtain file/folder information, to download or upload files, or to update file permissions. The data provider implementation 124 exposes a provider-specific API 128 which can be used to make calls to data provider 104 and to receive information from data provider 104. Assuming, for instance, that the data request was to view specific folder or file information (so the user can, for example, attach an object to an electronic mail message or make it available to a group in a social network or otherwise), data provider implementation 124 thus makes the web service calls over API 128 to data provider 104 in order to retrieve the folder and file metadata that makes up the document library in data store 132. Accessing the data provider implementation for the identified data provider and making the service calls using that implementation are indicated by blocks 164 and 166 in the flow diagram of FIG. 2, respectively. The service calls illustratively identify the particular user, as indicated by block 168, and identify the requested data as indicated by block 170. The service calls can include other information 172 as well.

In any case, data provider implementation 124 receives the requested information over API 128 from data provider 104. This is indicated by block 174. The data can be received from the different data providers in a wide variety of different ways. For instance, some data providers provide the data as a serialization 176. It can be received in other ways as well, such as in XML 178, or in other ways that are specific to the given data provider from which the information is received. This is indicated by block 180.

The received data is then provided to data parsing component 116 where it is parsed. This is indicated by block 182. The particular way that the data is parsed will depend on the particular data provider that it was received from. For instance, data parsing component 116 can apply various parsing rules, based upon the particular data provider providing the data, and based upon the particular provider-specific way that the data is provided. By way of example, if two different data providers provide requested data as a serialized output, the items in the serialization may be in different order. They may also be named using different naming conventions. Therefore, the requested data is parsed into the desired parts (that will eventually be presented to the user) by data parsing component 116. Parsing the order of serialization is indicated by block 184 in the flow diagram of FIG. 2. Parsing the actual items in the serialization is indicated by block 186. Parsing according to naming convention is indicated by block 188. These are all exemplary only. Also, in one embodiment, some provider-specific functionality can be retained. For instance, if a given provider provides functions or provider-specific features, parsing component 116 can retain enough information to retain those functions or features when the data is provided to the user. This is indicated by block 189 in FIG. 2. The parsing can take a wide variety of other forms as well, and this is indicated by block 190.

The parsed data is then provided to common data model component 118. Component 118 illustratively places the parsed data into a common data structure and can store it in cache 115. This is indicated by block 192 of the flow diagram of FIG. 2. The common data structure can take a wide variety of different forms. However, in one embodiment, the common data structure presents data according to a common structure so that it can be viewed in the same way, by user 108, regardless of the particular data provider that provided the data. Thus, user 108 need not become familiar with a wide variety of different data presentation structures that are used to view data in the different data providers. Instead, common data model component 118 places the data into a common data structure that is then provided to client 110. Sending the common data structure to client 110 is indicated by block 194 in FIG. 2.

The data can be sent in a variety of different ways, and it can be subjected to various optimizations. For instance, the client communication component 122 can illustratively download more than the requested data and store it in cache 115. Component 122 can then send only part of the data, and then send additional parts based on client interactions. By way of example, it may be that client communication component 122 only sends the file folder tree that was obtained from data provider 104. As the user navigates the file folder tree, additional information will be sent from cache 115 based on the user's navigation inputs. Also, as an example, if a user selects a file, client communication component 122 can begin to send that file information, even before the user has requested that it be downloaded. This reduces the latency when the user actually wishes to download the file. Alternatively, client communication component 122 can provide the data over API 136 to client device 110, without optimizing. Providing only part of the data is indicated by block 196 and responding to client requests from cache 115 is indicated by block 198. Providing the data in other ways is indicated by block 200 in the flow diagram of FIG. 2.

Figure 3A:
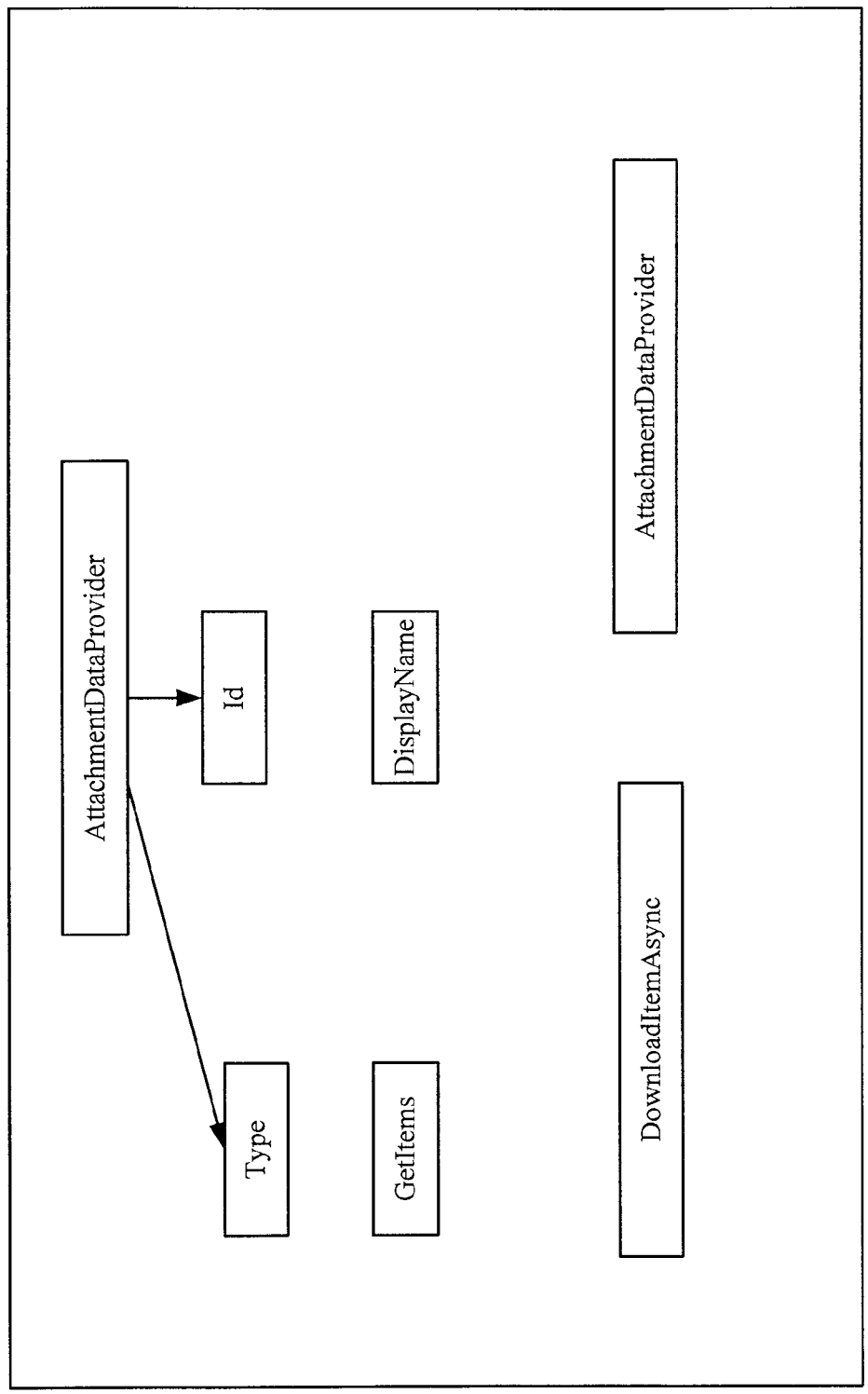
FIG. 3A is a diagram of one illustrative attachment data provider base class.

FIG. 3A shows one embodiment of an entity diagram that represents an AttachmentDataProvider base class that can be implemented in document sharing system 114. In one embodiment, the AttachmentDataProvider has an identifier (or ID) which is passed in by the client to identify the particular data provider from which data is being sought. It also includes a display name which is the actual name of the data provider that is displayed in the common data structure to user 108. The GetItems base method is used by client device 110 to make a call with a data identifier (e.g., an attachment identifier) that identifies the specific content in the identified data provider that is requested (e.g., a given file in a given folder, etc.).

Figure 3B:
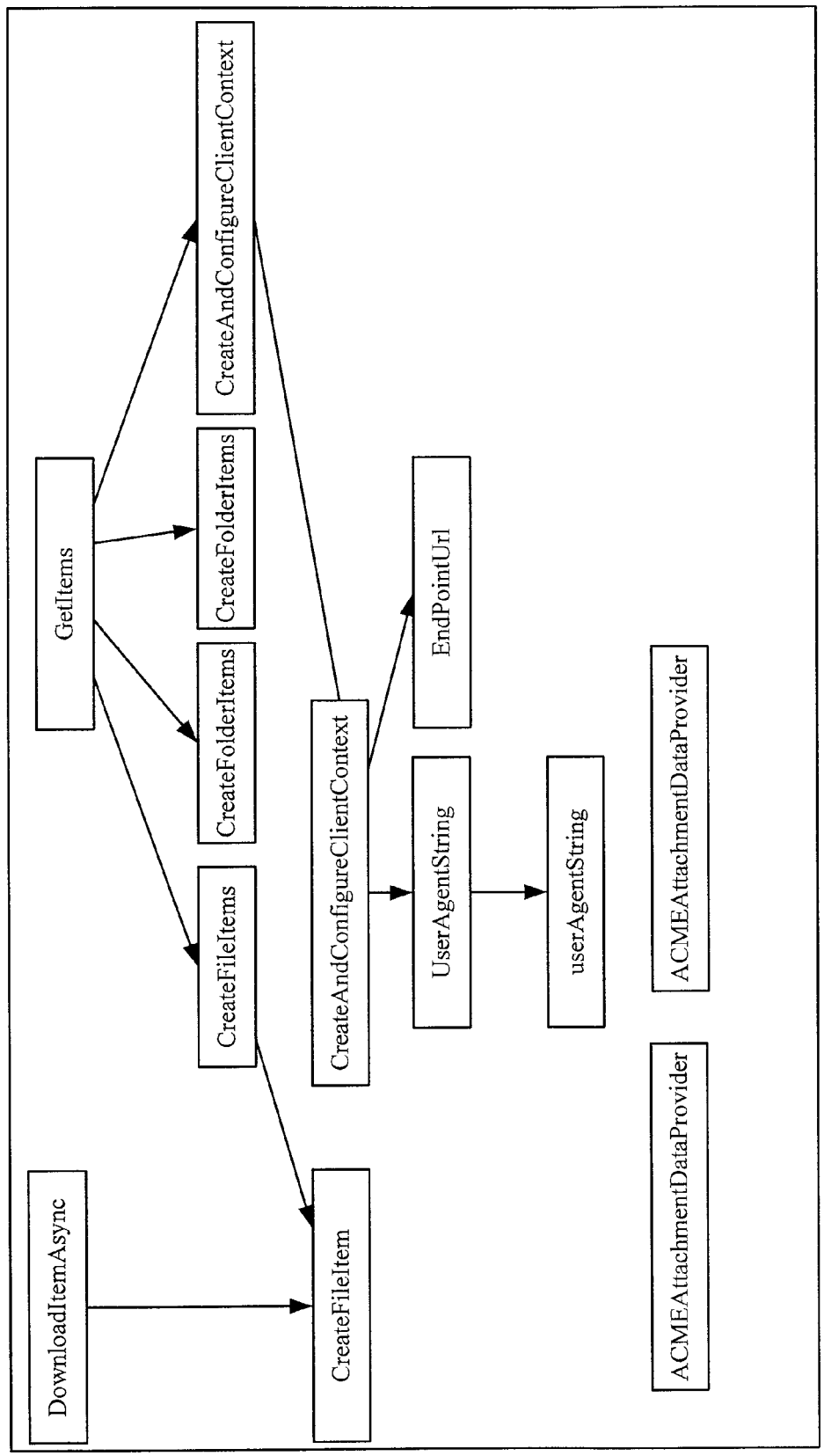
FIG. 3B is a diagram of one illustrative implementation of the base class shown in FIG. 3A, for a given data provider.

FIG. 3B is a diagram of a type of the AttachmentDataProvider shown in FIG. 3A, but which provides a specific implementation for a specific data provider. In the embodiment shown in FIG. 3B, the implementation is for the ACME data provider, although this is exemplary only. A number of things should be noted. The end point URL indicates the base web address of the provider. The client context is created from this. The CreateAndConfigureClientContext identifies the particular user that the data sharing system is working on behalf of. This information allows the data provider to determine whether the specific user (or client) has access to the requested data. The client context can thus be passed to the data provider with all calls for data.

The AttachmentDataProvider base class shown in FIG. 3A, and the specific data provider implementation shown in FIG. 3B are exemplary only. A wide variety of different base classes and specific implementations can be used.

It can thus be seen that by creating a new data type on the e-mail server 102 to represent different document store locations (or data providers) the type can be extended with specific implementations for different data stores. The extended class implements the necessary authentication and APIs to complete the processes with a specific location (e.g., with a specific data provider). When the client 110 makes a request to obtain data or to permission a file, it makes the same web service calls over API 136 to mail server 102, providing the attachment data provider ID. Server 102 then uses the extended implementation (124-126) for that provider to complete the requests and return data back to client 110. Because of these abstractions, multiple clients can easily connect with these data provider capabilities by implementing a relatively simple set of APIs, while mail server 102 performs the relatively costly processing to connect to all of the different data stores (or data providers). In addition, new data providers can be added by implementing a set of APIs on mail server 102 that can connect to the new data store (or data provider). Substantially the only change needed on the client, when a new data provider is added, is for the client to recognize the new data provider ID. Other than that, the client 110 stays substantially unchanged, even as new data providers are added. That is, even when new data stores are connected to mail store 102, client 110 makes substantially the same calls to mail server 102 in order to access information. The only new item for client 110 to access data on the new data provider is for client 110 to pass in the ID of the new data provider.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
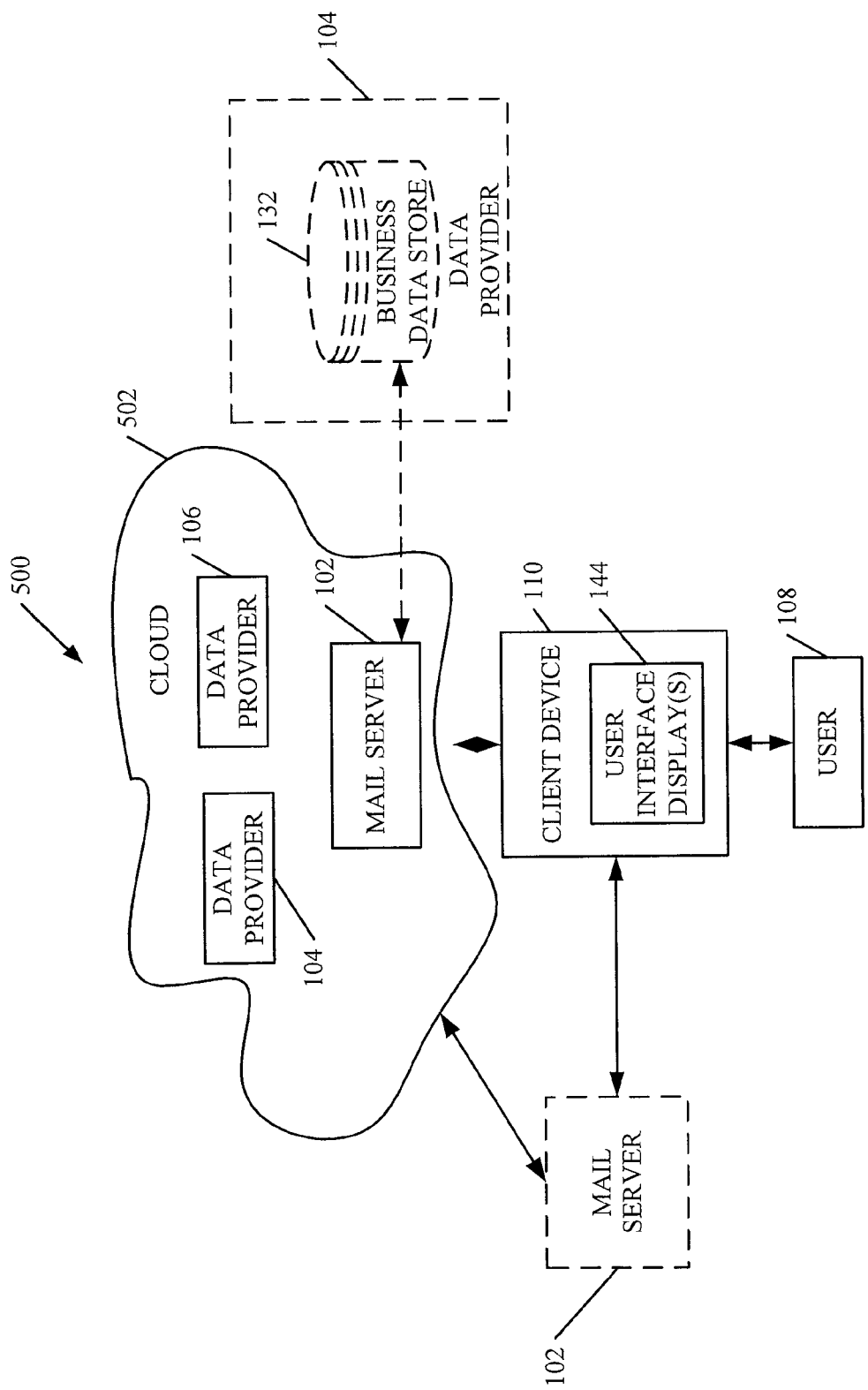
FIG. 4 is a block diagram of the architecture shown in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure.

Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 4, some items are similar to those shown in FIG. 1 and they are similarly numbered. FIG. 4 specifically shows that mail server 102 and data providers 104-106 are located in cloud 502 (which can be public, private, or a combination where portions are public while others are private). Therefore, user 108 uses a client device 110 to access those systems through cloud 502.

FIG. 4 also depicts another embodiment of a cloud architecture. FIG. 4 shows that it is also contemplated that some elements of architecture 100 are disposed in cloud 502 while others are not. By way of example, data providers 104-106 can be disposed outside of cloud 502, and accessed through cloud 502 (in FIG. 4, data provider 104 is shown outside cloud 502, in one embodiment). In another embodiment, mail server 102 can also be outside of cloud 502 (and may be local to client device 110, or located elsewhere). Regardless of where they are located, they can be accessed directly by device 110, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
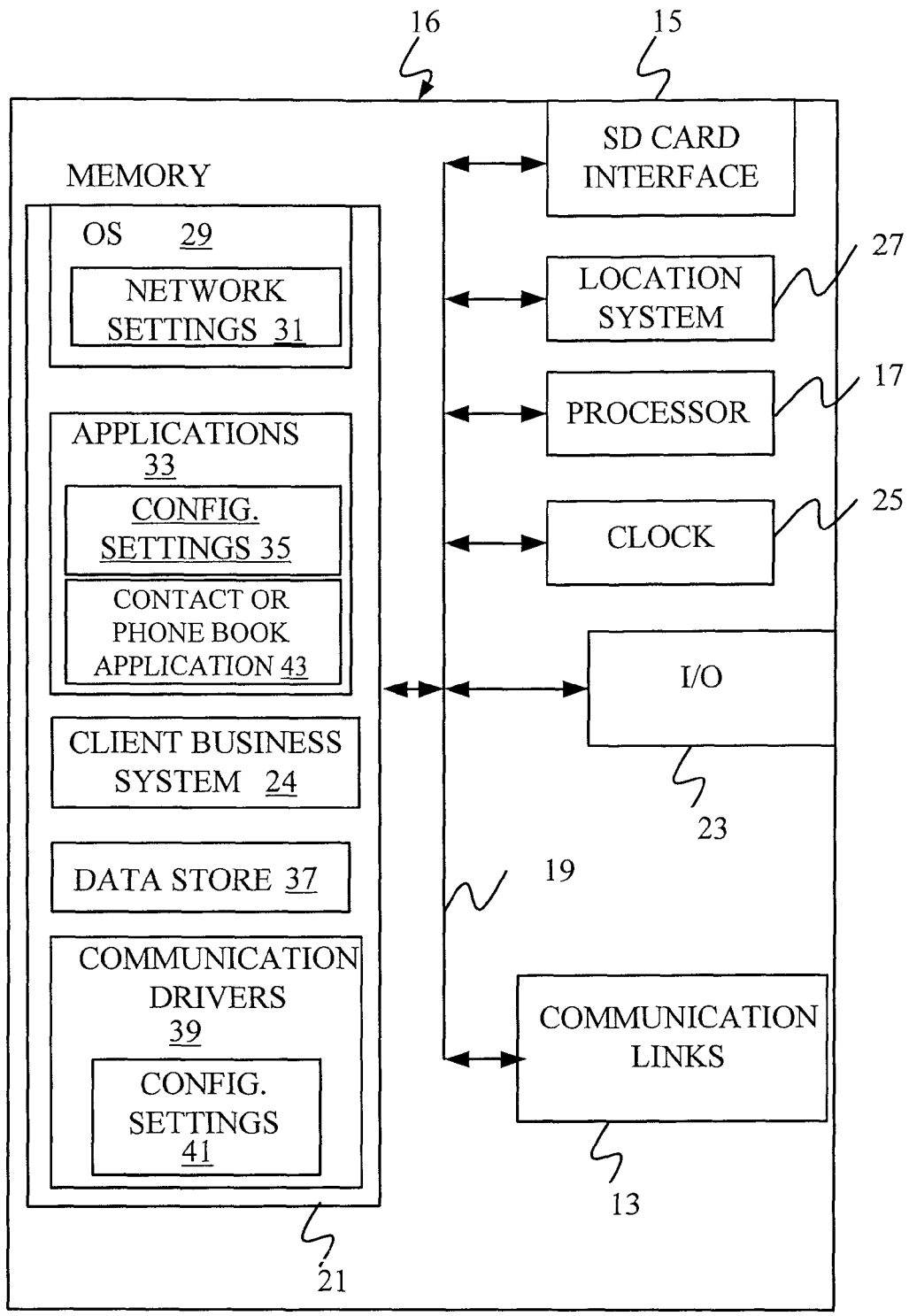
FIGS. 5-9 show various embodiments of mobile devices.

FIG. 5 is a simplified block diagram of one illustrative embodiment of a handheld or mobile computing device that can be used as a user's or client's hand held device 16, in which architecture 100 (or parts of it) can be deployed. FIGS. 6-9 are examples of handheld or mobile devices.

FIG. 5 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 112 or 138 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
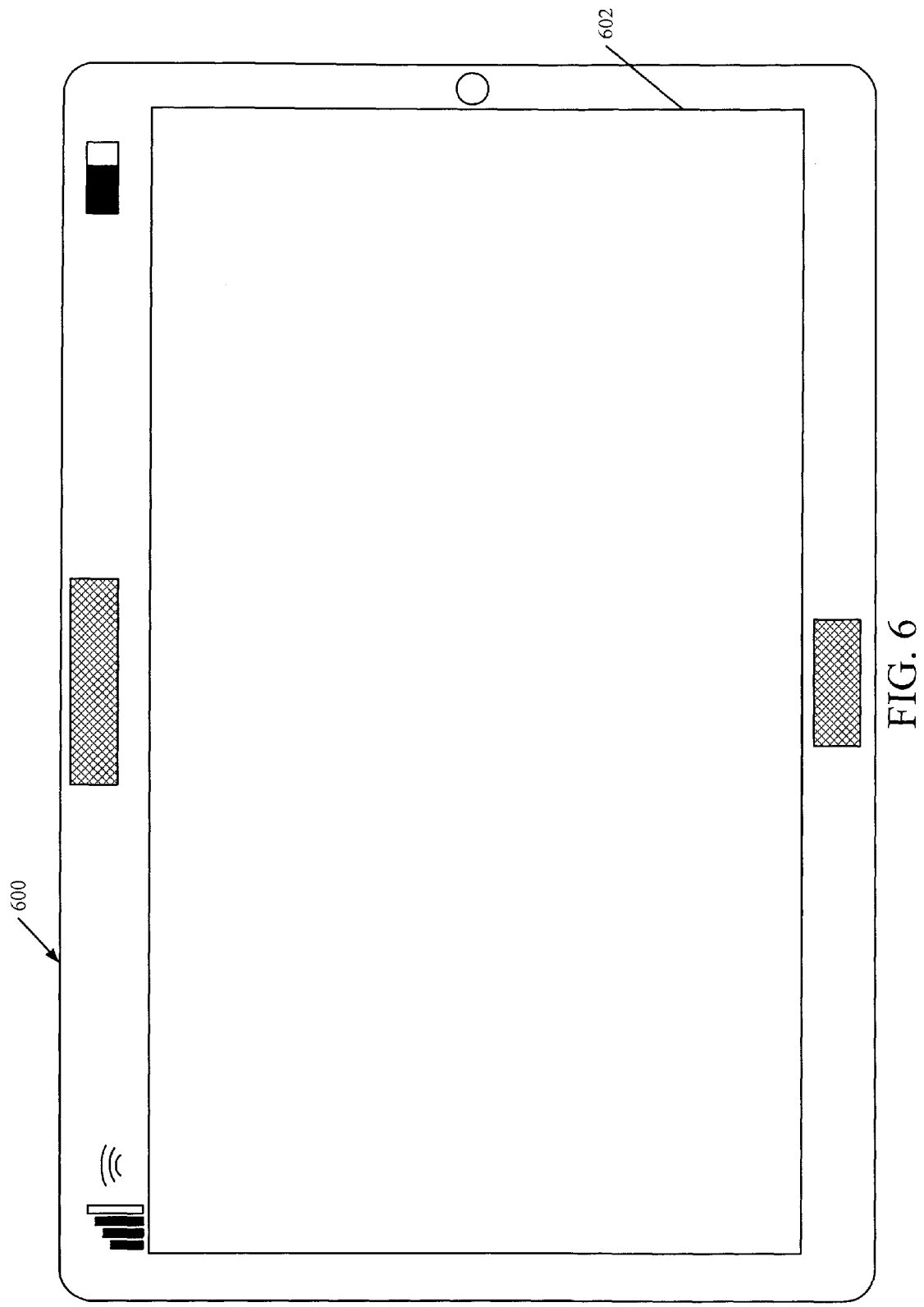

FIG. 6 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 7:
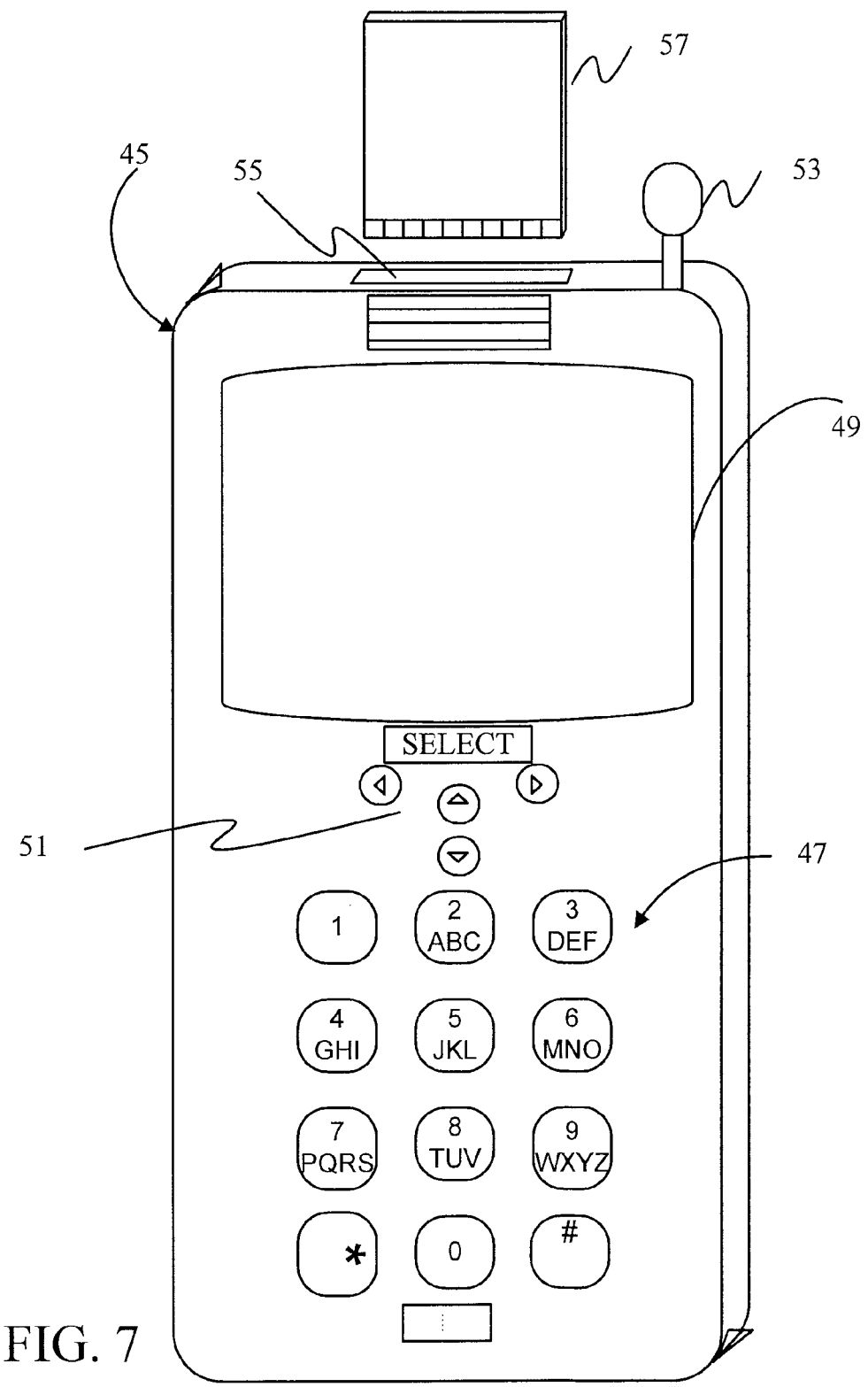
Figure 8:
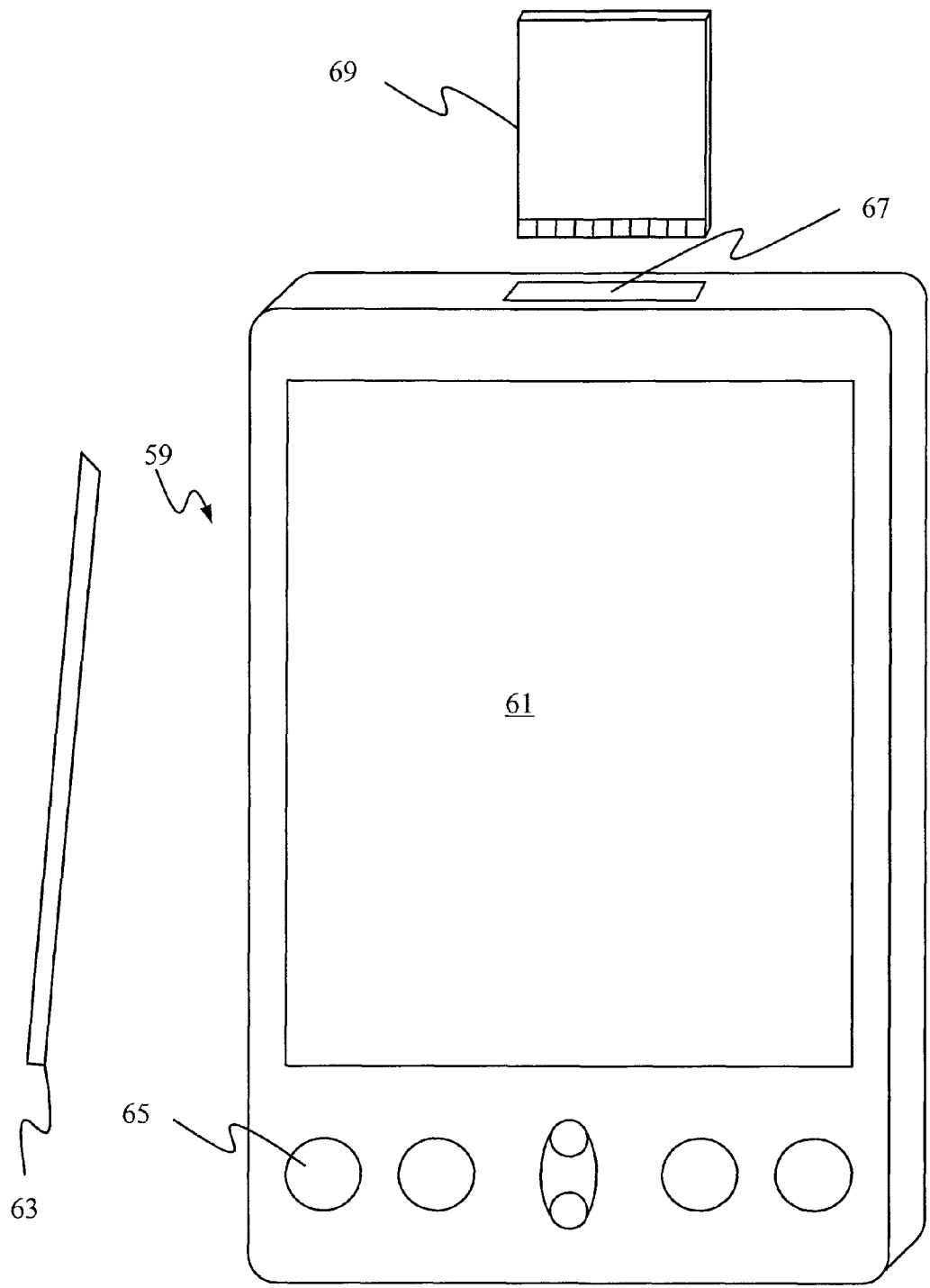

FIGS. 7 and 8 provide additional examples of devices 16 that can be used, although others can be used as well. In FIG. 7, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 9:
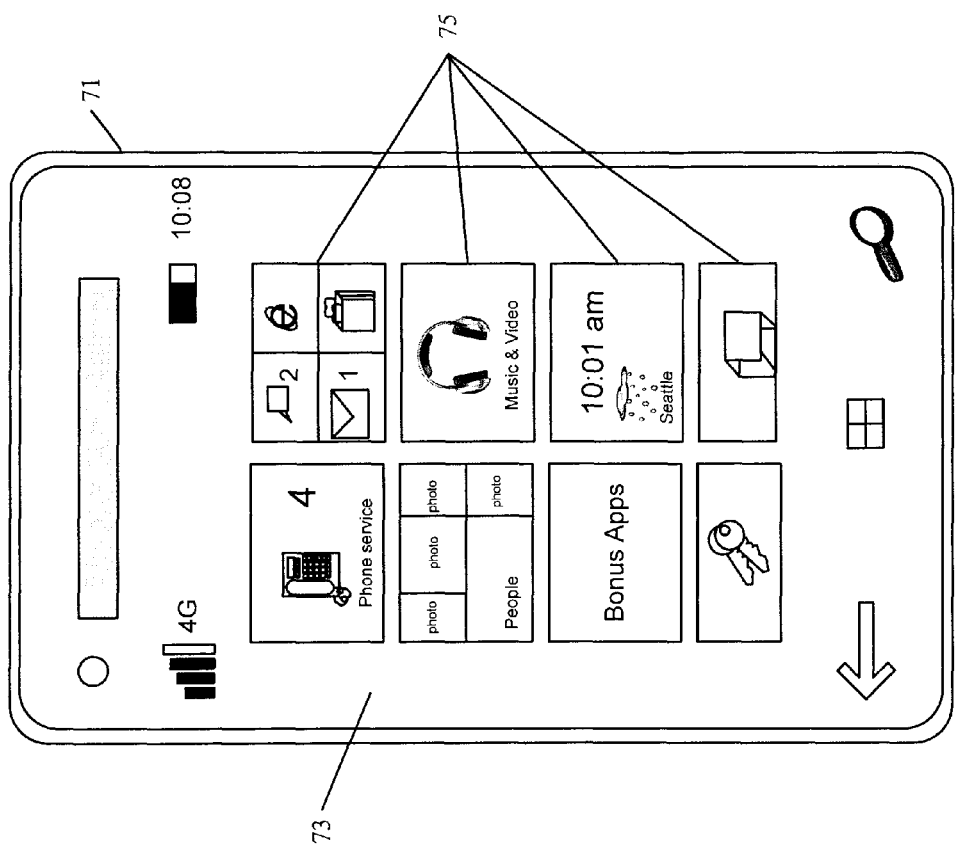

FIG. 9 is similar to FIG. 7 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
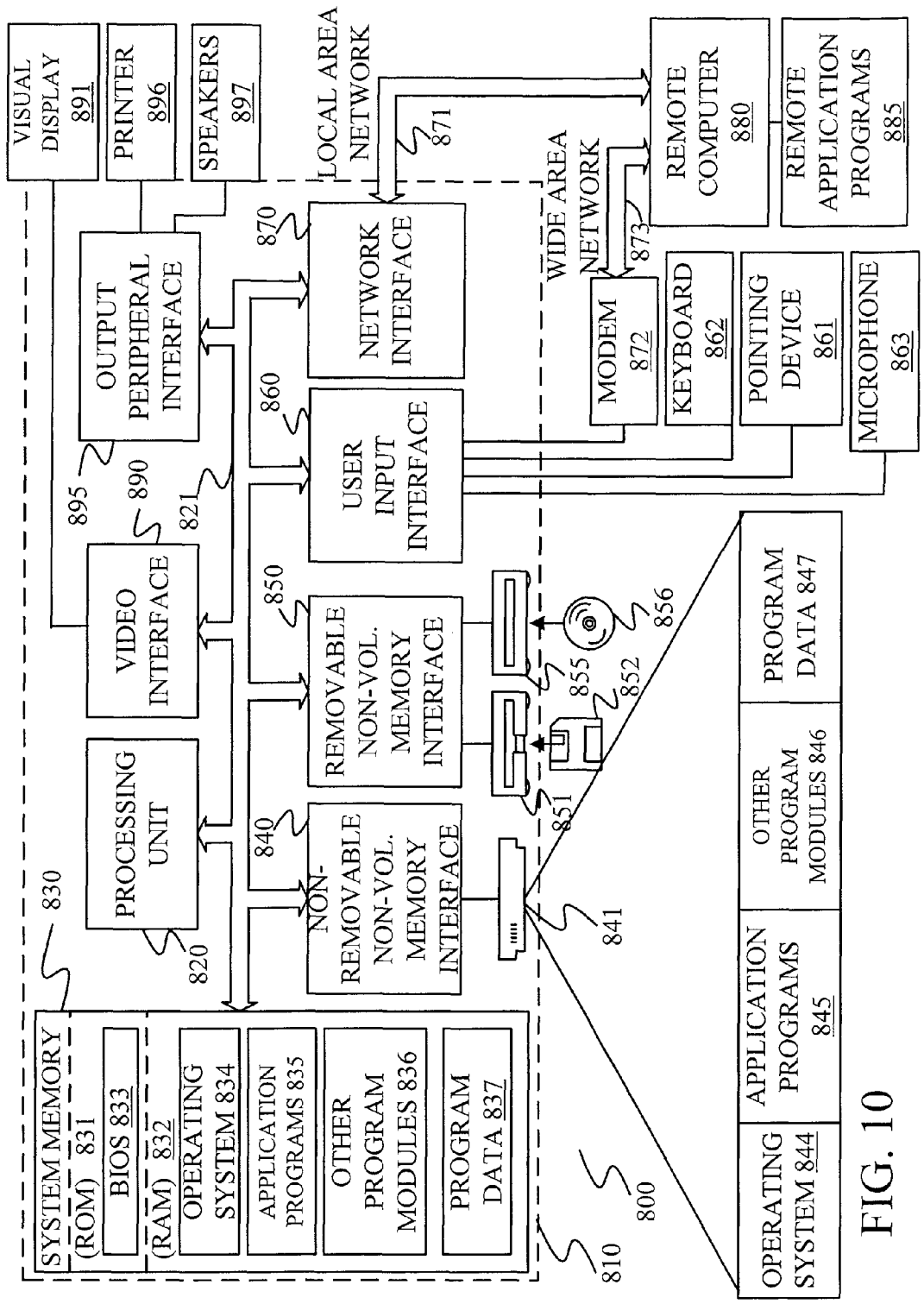
FIG. 10 is a block diagram of one illustrative computing environment.

FIG. 10 is one embodiment of a computing environment in which architecture 100, or parts of it, (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 112 or 138), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving, by an electronic messaging system server from a client device, a client data request associated with a client messaging application on the client device, the client messaging application being configured to send an electronic message to a recipient through the electronic messaging system server; and
   the client data request indicating requested data and including a data provider identifier identifying a particular data provider from a plurality of different data providers, wherein each of the plurality of different data providers are separate from the electronic messaging system server and configured to communicate with the electronic messaging system server using a different data structure;
   identifying, by the electronic messaging system server, a plurality of different data provider implementations in the electronic messaging system server,
      wherein each data provider implementation corresponds to one of the plurality of different data providers, exposes a different provider-specific application programming interface (API), and is configured to process data received from the corresponding data provider through the provider-specific API to a common data structure that is a same data structure regardless of the data provider from which the data is received;
   based on the data provider identifier, selecting a particular one of the data provider implementations that corresponds to the particular data provider identified by the data provider identifier;
   making, by the electronic messaging system server, a data service call to the identified data provider using the provider-specific API exposed by the selected data provider implementation that corresponds to the identified data provider;
   receiving, by the electronic messaging system server, the requested data from the identified data provider through the provider-specific API exposed by the selected data provider implementation;
   after receiving the requested data,
      parsing, by the electronic messaging system server using a provider-specific parsing component that is specific to the identified data provider, the requested data received from the identified data provider to identify portions of the requested data that are placed into the common data structure; and
   providing, by the electronic messaging system server, the requested data, placed into the common data structure, to the client device.

2. The computer-implemented method of claim 1, wherein the electronic messaging system server comprises an email server, and receiving the client data request comprises:
   exposing, by the email server, a client-facing application programming interface, common to a plurality of different client devices; and
   receiving, by the email server, the client data request through the client-facing application programming interface.

3. The computer-implemented method of claim 1 wherein receiving the requested data comprises receiving the requested data in a data provider-specific form, that is specific to the identified data provider.

4. The computer-implemented method of claim 1, herein parsing the requested data comprises:
   identifying a parsing rule based on the identified data provider; and
   using the identified parsing rule to parse the requested data.

5. The computer-implemented method of claim 1 and further comprising:
   caching the requested data, prior to sending it to the client.

6. An electronic messaging system, comprising:
   a data provider communication component comprising a plurality of different data provider implementations, each exposing a different provider-specific application programming interface (API) that is specific to, and configured to communicate with, a particular data provider from a plurality of different data providers that each provide data to the electronic messaging system in different provider-specific forms;
   a client communication component configured to receive a data request from a client device, the data request being associated with a client messaging application on the client device, the client messaging application being configured to send an electronic message to a recipient through the electronic messaging system;
   a data provider identification component configured to identify a particular one of the data providers based on the data request from the client device, wherein the electronic messaging system is configured to select the data provider implementation corresponding to the identified data provider and use the provider-specific API exposed by the selected data provider implementation to obtain the requested data from the identified data provider; and
   a data parsing component configured to:
      select a parsing rule corresponding to the identified data provider;
      use the selected parsing rule to parse the requested data; and
      based on the parsing of the requested data, place the requested data in a common data structure that is common across the plurality of different data providers;
   wherein the client communication component is configured to send the requested data, placed in the common data structure, to the client device.

7. The electronic messaging system of claim 6 wherein the data request from the client device includes a data provider identifier identifying the particular data provider from the plurality of different data providers.

8. The electronic messaging system of claim 7, wherein the data parsing component is configured to:
   access a collection of parsing rules, each parsing rule corresponding to a different one of the data providers; and
   selecting the parsing rule from the collection of parsing rules, based on the data provider identifier.

9. The electronic messaging system of claim 6 wherein the data parsing component is configured to parse the requested data using provider-specific parsing, that is specific to the identified data provider and based on the selected parsing rule.

10. The electronic messaging system of claim 6 and further comprising:
    a common data model component configured to place the different portions of the requested data into the common data structure.

11. The electronic messaging system of claim 6, wherein the requested data is received in a data provider-specific form, that is specific to the identified data provider.

12. The electronic messaging system of claim 6, wherein the client communication component is configured to expose a client-facing application programming interface to receive data requests and provide the requested data to the client device.

13. The electronic messaging system of claim 6, and further comprising:
    a cache configured to cache the requested data after it is parsed by the data parsing component.

14. A computing system comprising:
    a processor; and
    memory storing instructions which, when executed by the processor, configure the computing system to:
       expose a client-facing application programming interface (API), wherein the computing system is configured to receive data requests from a client device, through the client-facing API, that are in accordance with a client-specific format and request data from a plurality of different data providers that each utilize a different data communication format;
       receive, by an electronic messaging server through the client-facing API, a particular client data request from the client device, the particular client data request being associated with a client messaging application on the client device and indicating requested data, the particular client data request including a data provider identifier identifying a data provider from the plurality of different data providers, wherein the client messaging application is configured to send an electronic message to a recipient through the electronic messaging server;
       identify a plurality of different data provider implementations in the computing system, each of the different data provider implementations corresponding to one of the plurality of different data providers;
       based on the data provider identifier, selecting a particular one of the data provider implementations;
       make a data service call to the identified data provider using the selected data provider implementation that exposes a provider-specific application programming interface (API) that is specific to the identified data provider;
       receive, through the provider-specific API, the requested data from the identified data provider;
       place the requested data into a common data structure that is a same data structure, regardless of the data provider from which the requested data is received; and
       provide, by the electronic messaging server through the client-facing API, the requested data, in the common data structure, to the client device.

15. The computing system of claim 14 wherein the instructions configure the computing system to:
    parse the requested data to identify portions of the requested data to be placed in the common data structure.

16. The computing system of claim 15 wherein the requested data is received in a data provider-specific form.

17. The computing system of claim 16 wherein the instructions configure the computing system to:
    parse the requested data using provider-specific parsing to identify the portions of the requested data to be placed in the common data structure.

18. The computing system of claim 14, wherein the particular client data request from the client device includes a data provider identifier identifying the particular data provider from the plurality of different data providers.

19. The computing system of claim 18, wherein the instructions configure the computing system to:

access a collection of parsing rules, each parsing rule corresponding to a different one of the data providers; and select the parsing rule from the collection of parsing rules, based on data provider identifier.

\* \* \* \* \*